(12) United States Patent
Vaissié et al.

(10) Patent No.: US 7,436,866 B2
(45) Date of Patent: Oct. 14, 2008

(54) COMBINATION OPTICAL ISOLATOR AND PULSE COMPRESSOR

(75) Inventors: Laurent Vaissié, Oviedo, FL (US); James Francis Brennan, III, Winter Park, FL (US)

(73) Assignee: Raydiance, Inc., Orlando, FL (US)

( * ) Notice: Subject to any disclaimer, the term of this patent is extended or adjusted under 35 U.S.C. 154(b) by 117 days.

(21) Appl. No.: 11/291,609

(22) Filed: Nov. 30, 2005

(65) Prior Publication Data
US 2007/0121686 A1 May 31, 2007

(51) Int. Cl.
*H01S 3/10* (2006.01)
(52) U.S. Cl. .......................... 372/27; 372/102
(58) Field of Classification Search ............ 372/27, 372/102
See application file for complete search history.

(56) References Cited

U.S. PATENT DOCUMENTS

| | | | |
|---|---|---|---|
| 3,631,362 A | 12/1971 | Almasi et al. |
| 3,808,549 A | 4/1974 | Maurer |
| 3,963,953 A | 6/1976 | Thornton, Jr. |
| 4,194,813 A | 3/1980 | Benjamin et al. |
| 4,289,378 A | 9/1981 | Remy et al. |
| 4,718,418 A | 1/1988 | L'Esperance, Jr. |
| 4,722,591 A | 2/1988 | Haffner |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,829,529 A | 5/1989 | Kafka |
| 4,902,127 A | 2/1990 | Byer et al. |
| 4,913,520 A | 4/1990 | Kafka |
| 4,915,757 A | 4/1990 | Rando |
| 4,972,423 A | 11/1990 | Alfano et al. |
| 5,014,290 A | 5/1991 | Moore et al. |
| 5,022,042 A | 6/1991 | Bradley |
| 5,043,991 A | 8/1991 | Bradley |
| 5,132,996 A | 7/1992 | Moore et al. |
| 5,162,643 A | 11/1992 | Currie |
| 5,166,818 A | 11/1992 | Chase et al. |

(Continued)

FOREIGN PATENT DOCUMENTS

EP 214100 A 3/1987

(Continued)

OTHER PUBLICATIONS

U.S. Appl. No. 10/916,368, Richard Stoltz, Pulse Energy Adjustment for Changes in Ablation Spot Size, filed Aug. 11, 2004.

(Continued)

*Primary Examiner*—Dung T Nguyen
(74) *Attorney, Agent, or Firm*—Carr & Ferrell LLP

(57) ABSTRACT

Optical systems configured for both changing the length of a laser pulse and operating as an optical isolator are disclosed. In some embodiments, optical isolation is achieve contemporaneously with laser pulse expansion or compression by using a grating based compressor or expander as one of the polarization elements of the optical isolator. In some embodiments, optical isolation is achieved contemporaneously with laser pulse expansion or compression by using a mode converter and a Bragg fiber as one of the polarization elements of the optical isolator. In some embodiments, a sub-wavelength polarizer including magnetic garnet is included in the optical isolator.

8 Claims, 5 Drawing Sheets

U.S. PATENT DOCUMENTS

| | | |
|---|---|---|
| 5,187,759 A | 2/1993 | DiGiovanni et al. |
| 5,237,576 A | 8/1993 | DiGiovanni et al. |
| 5,265,107 A | 11/1993 | Delfyett, Jr. |
| 5,267,077 A * | 11/1993 | Blonder .................... 359/280 |
| 5,291,501 A | 3/1994 | Hanna |
| 5,302,835 A | 4/1994 | Bendett et al. |
| 5,313,262 A | 5/1994 | Leonard |
| 5,329,398 A | 7/1994 | Lai et al. |
| 5,367,143 A | 11/1994 | White, Jr. |
| 5,400,350 A | 3/1995 | Galvanauskas |
| 5,414,725 A | 5/1995 | Fermann et al. |
| 5,418,809 A | 5/1995 | August, Jr. et al. |
| 5,430,572 A | 7/1995 | DiGiovanni et al. |
| 5,440,573 A | 8/1995 | Fermann |
| 5,450,427 A | 9/1995 | Fermann et al. |
| 5,479,422 A | 12/1995 | Fermann et al. |
| 5,489,984 A | 2/1996 | Hariharan et al. |
| 5,499,134 A | 3/1996 | Galvanauskas et al. |
| 5,517,043 A | 5/1996 | Ma et al. |
| 5,548,098 A | 8/1996 | Sugawara et al. |
| 5,572,335 A | 11/1996 | Stevens |
| 5,572,358 A | 11/1996 | Gabl et al. |
| 5,585,652 A | 12/1996 | Kamasz et al. |
| 5,585,913 A | 12/1996 | Hariharan et al. |
| 5,592,327 A | 1/1997 | Gabl et al. |
| 5,596,668 A | 1/1997 | DiGiovanni et al. |
| 5,602,677 A | 2/1997 | Tournois |
| 5,617,434 A | 4/1997 | Tamura et al. |
| 5,627,848 A | 5/1997 | Fermann et al. |
| 5,633,750 A | 5/1997 | Nogiwa et al. |
| 5,633,885 A | 5/1997 | Galvanauskas et al. |
| 5,651,018 A | 7/1997 | Mehuys et al. |
| 5,656,186 A | 8/1997 | Mourou et al. |
| 5,663,731 A | 9/1997 | Theodoras, II et al. |
| 5,677,769 A | 10/1997 | Bendett |
| 5,689,519 A | 11/1997 | Fermann et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Thoedoras, II et al. |
| 5,720,894 A | 2/1998 | Neev et al. |
| 5,726,855 A | 3/1998 | Mourou et al. |
| 5,778,016 A | 7/1998 | Sucha et al. |
| 5,818,630 A | 10/1998 | Fermann et al. |
| 5,822,097 A | 10/1998 | Tournois |
| 5,847,863 A | 12/1998 | Galvanauskas et al. |
| 5,862,287 A | 1/1999 | Stock et al. |
| 5,862,845 A | 1/1999 | Chin et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,936,716 A | 8/1999 | Pinsukanjana et al. |
| 6,014,249 A | 1/2000 | Fermann et al. |
| 6,020,591 A | 2/2000 | Harter et al. |
| 6,034,975 A | 3/2000 | Harter et al. |
| 6,061,373 A | 5/2000 | Brockman et al. |
| 6,072,811 A | 6/2000 | Fermann et al. |
| 6,075,588 A | 6/2000 | Pinsukanjana et al. |
| 6,081,369 A | 6/2000 | Waarts et al. |
| 6,120,857 A | 9/2000 | Balooch et al. |
| 6,130,780 A | 10/2000 | Joannopoulos et al. |
| 6,151,338 A | 11/2000 | Grubb et al. |
| 6,154,310 A | 11/2000 | Galvanauskas et al. |
| 6,156,030 A | 12/2000 | Neev |
| 6,181,463 B1 | 1/2001 | Galvanauskas et al. |
| 6,198,568 B1 | 3/2001 | Galvanauskas et al. |
| 6,208,458 B1 | 3/2001 | Galvanauskas et al. |
| 6,246,816 B1 | 6/2001 | Moore et al. |
| 6,249,630 B1 | 6/2001 | Stock et al. |
| 6,252,892 B1 | 6/2001 | Jiang et al. |
| 6,256,328 B1 | 7/2001 | Delfyett et al. |
| 6,269,108 B1 | 7/2001 | Tabirian et al. |
| 6,275,250 B1 | 8/2001 | Sanders et al. |
| 6,275,512 B1 | 8/2001 | Fermann |
| 6,314,115 B1 | 11/2001 | Delfyett et al. |
| 6,327,074 B1 | 12/2001 | Bass et al. |
| 6,327,282 B2 | 12/2001 | Hammons et al. |
| 6,334,011 B1 | 12/2001 | Galvanauskas et al. |
| 6,335,821 B1 | 1/2002 | Suzuki et al. |
| 6,370,171 B1 | 4/2002 | Horn et al. |
| 6,404,944 B1 | 6/2002 | Wa et al. |
| 6,421,169 B1 | 7/2002 | Bonnedal et al. |
| 6,433,305 B1 | 8/2002 | Liu et al. |
| 6,433,760 B1 | 8/2002 | Vaissie et al. |
| 6,501,590 B2 | 12/2002 | Bass et al. |
| 6,522,460 B2 | 2/2003 | Bonnedal et al. |
| 6,525,873 B2 | 2/2003 | Gerrish et al. |
| 6,526,327 B2 | 2/2003 | Kar et al. |
| 6,529,319 B2 | 3/2003 | Youn et al. |
| 6,549,547 B2 | 4/2003 | Galvanauskas et al. |
| 6,567,431 B2 | 5/2003 | Tabirian et al. |
| 6,573,813 B1 | 6/2003 | Joannopoulos et al. |
| 6,574,024 B1 | 6/2003 | Liu |
| 6,576,917 B1 | 6/2003 | Silfvast |
| 6,580,553 B2 | 6/2003 | Kim et al. |
| 6,597,497 B2 | 7/2003 | Wang et al. |
| 6,603,911 B2 | 8/2003 | Fink et al. |
| 6,621,045 B1 | 9/2003 | Liu et al. |
| 6,627,844 B2 | 9/2003 | Liu et al. |
| 6,642,477 B1 | 11/2003 | Patel et al. |
| 6,647,031 B2 | 11/2003 | Delfyett et al. |
| 6,654,161 B2 | 11/2003 | Bass et al. |
| 6,661,816 B2 | 12/2003 | Delfyett et al. |
| 6,671,298 B1 | 12/2003 | Delfyett et al. |
| 6,677,552 B1 | 1/2004 | Tulloch et al. |
| 6,690,686 B2 | 2/2004 | Delfyett et al. |
| 6,710,288 B2 | 3/2004 | Liu et al. |
| 6,710,293 B2 | 3/2004 | Liu et al. |
| 6,720,519 B2 | 4/2004 | Liu et al. |
| 6,723,991 B1 | 4/2004 | Sucha et al. |
| 6,749,285 B2 | 6/2004 | Liu et al. |
| 6,787,734 B2 | 9/2004 | Liu |
| 6,791,060 B2 | 9/2004 | Dunsky et al. |
| 6,803,539 B2 | 10/2004 | Liu et al. |
| 6,804,574 B2 | 10/2004 | Liu et al. |
| 6,815,638 B2 | 11/2004 | Liu |
| 6,819,702 B2 | 11/2004 | Sverdlov et al. |
| 6,819,837 B2 | 11/2004 | Li et al. |
| 6,829,517 B2 | 12/2004 | Cheng et al. |
| 6,878,900 B2 | 4/2005 | Corkum et al. |
| 6,897,405 B2 | 5/2005 | Cheng et al. |
| 2002/0176676 A1 | 11/2002 | Johnson et al. |
| 2003/0161378 A1* | 8/2003 | Zhang et al. ................ 372/102 |
| 2003/0214714 A1* | 11/2003 | Zheng ........................ 359/484 |
| 2004/0231682 A1 | 11/2004 | Stoltz |
| 2005/0035097 A1 | 2/2005 | Stoltz |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0074974 A1 | 4/2005 | Stoltz |
| 2005/0077275 A1 | 4/2005 | Stoltz |
| 2005/0111073 A1* | 5/2005 | Pan et al. .................... 359/280 |
| 2005/0127049 A1 | 6/2005 | Woeste et al. |
| 2005/0167405 A1 | 8/2005 | Stoltz et al. |
| 2005/0171516 A1 | 8/2005 | Stoltz |
| 2005/0171518 A1 | 8/2005 | Stoltz et al. |
| 2005/0177143 A1 | 8/2005 | Bullington et al. |
| 2005/0195726 A1 | 9/2005 | Bullington et al. |

| | | | |
|---|---|---|---|
| 2006/0056480 | A1 | 3/2006 | Mielke et al. |
| 2006/0067604 | A1* | 3/2006 | Bull et al. ............... 385/11 |

FOREIGN PATENT DOCUMENTS

| | | |
|---|---|---|
| JP | 2003181661 A | 7/2003 |
| JP | 2003-344883 * | 12/2003 |
| WO | WO 9428972 A1 | 12/1994 |
| WO | WO 2004/105100 A2 | 12/2004 |
| WO | WO 2004/114473 A2 | 12/2004 |
| WO | WO 2005/018060 A2 | 2/2005 |
| WO | WO 2005/018061 A2 | 2/2005 |
| WO | WO 2005/018062 A2 | 2/2005 |
| WO | WO 2005/018063 A2 | 2/2005 |

OTHER PUBLICATIONS

U.S. Appl. No. 11/057,867, Michael Marshall Mielke, Method of Generating an Ultra-Short Pulse Using a High-Frequency Ring Oscillator, filed Feb. 13, 2005.

U.S. Appl. No. 11/057,868, Michael Marshall Mielke, Amplifying of high Energy Laser Pulses, filed Feb. 13, 2005.

U.S. Appl. No. 11/224,867, Peter Delfyett, Laser Ablation Method and Apparatus Having a Feedback Loop and Control Unit, filed Sep. 12, 2005.

U.S. Appl. No. 11/233,634, James F. Brennan, III, Wavelength-Stabilized Pump Diodes for Pumping Gain Media in an Ultrashort Pulsed Laser System, filed Sep. 22, 2005.

U.S. Appl. No. 11/112,256, James F. Brennan, III, Bragg Fibers in Systems for the Generation of High Peak Power Light, filed Apr. 22, 2005.

U.S. Appl. No. 10/916,365, Richard Stoltz, Ablative Material Removal with a Preset Removal Rate or Volume or Depth, filed Aug. 11, 2005.

U.S. Appl. No. 11/333,824, Laurent Vaissie, Post Amplification Optical Isolator, filed Jan. 17, 2006.

U.S. Appl. No. 10/568,135, Jeff Bullington, High-Power-Optical-Amplifier Using a Number of Spaced, Thin Slabs, filed Feb. 10, 2006.

U.S. Appl. No. 11/281,144, Timothy Booth, Method and Apparatus for Optical Isolation in High Power Fiber-Optic Systems, filed Nov. 16, 2005.

Yeh et al., "Theory of Bragg Fiber", Journal of the Optical Society America, Sep. 1978, pp. 1196, vol. 68, No. 9.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Siegman, "Unstable Optical Resonators", Applied Optics, Feb. 1974, pp. 353-367, vol. 13, No. 2.

Koechner, "Solid State Laser Engineering", Oct. 29, 1999, Section 5.5, pp. 270-277, 5th Edition, Springer.

Chen et al. "Dispersion-Managed Mode Locking", Journal of the Optical Society of America B, Nov. 1999, pp. 1999-2004, vol. 16, No. 11, Optical Society of America.

Resan et al. "Dispersion-Managed Semiconductor Mode-Locked Ring Laser", Optics Letters, Aug. 1, 2003, pp. 1371-1373, vol. 28, No. 15, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Delfyett, P et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Levy et al., "Engineering Space-Variant INhomogeneous Media for Polarization Control," Optics Letters, Aug. 1, 2004, pp. 1718-1720, vol. 29, No. 15, Optical Society of America.

Ibanescu et al., "Analysis of Mode Structure in Hollow Dielectric Waveguide Fibers," Physical Review E 67, 2003, The American Physical Society.

* cited by examiner

COMBINATION OPTICAL ISOLATOR AND PULSE COMPRESSOR

BACKGROUND

1. Field of the Invention

The invention is in the field of laser systems and specifically in the field of short laser pulse generation.

2. Related Art

Optical isolators are used in laser systems to assure that light travels in one direction but not another. For example, in a ring laser system an optical isolator can be used to assure that light travels in one direction around the ring rather than in both directions. Optical isolators can also be used to prevent light from traveling back along a beam path from an amplifier to sensitive components of a laser system.

As illustrated in FIG. 1 an Optical Isolator 100 typically includes an Entrance Polarizer 110, a Faraday Rotator 120 and an Exit Polarizer 130. Light 140 can pass from Entrance Polarizer 110, through Faraday Rotator 120 and out through Exit Polarizer 130, but is prevented from passing in the reverse direction, e.g., through Exit Polarizer 130, Faraday Rotator 120 and then out through Entrance Polarizer 110. Optical polarizers of the type illustrated in FIG. 1 typically have transmission efficiencies in the range of 50 percent in the forward direction and 0.1 percent in the reverse direction. Further details of prior art optical isolators can be found in K Shiraishi, S Sugaya, & S Kawakami, "Fiber Faraday rotator", Applied Optics 23 (7) [1 Apr. 1984] pp. 1103-1106.

One technique that makes use of optical isolators is chirped pulse amplification (CPA). As illustrated in FIG. 2, a CPA 200 includes a Pulse Source 210, a Pulse Expander 220, an Optical Isolator 100, a Pulse Amplifier 240 and a Pulse Compressor 250. Optical Isolator 100 is configured to prevent light, for example generated by spontaneous emission within Pulse Amplifier 240, from traveling back to Pulse Source 210. Light pulses generated using Pulse Amplifier 240 and Pulse Compressor 250 are optionally directed at a Target Material 260 for the purposes of material modification, ablation, or the like. Further information regarding CPA can be found "Ultrafast lasers: Technology and Applications," eds. M E Fermann, A Galvanauskas, G Sucha [Marcel Dekker, Inc., New York, 2003], ISBN 0-8247-0841-5.

The systems of the prior art have a number of disadvantages including, for example, the inefficiency of Optical Isolator 100, the size of bulk optical components, and the sensitivity of Optical Isolator 100 to high peak power light and angular alignment. There is, therefore, a need for improved systems and methods in CPA systems.

SUMMARY

Embodiments of the invention include components configured at the same time to function as both a pulse compressor and an optical isolator. Both isolation and pulse compression are achieved by using a pulse compressor as a polarizer within an optical isolator. The pulse compressor compresses a laser pulse while at the same time helping to assure that any light traveling in the reverse direction will have a polarization that will prevent it from passing completely through an optical isolator. In some embodiments, one of the polarizers within the combination compressor/isolator includes a sub-wavelength polarizer with integrated magnetic materials.

Embodiments of the invention further include an optical isolator disposed along a beam path between a final pulse amplifier and a target material. This optical isolator is configured to prevent light generated at the target material, for example through Rayleigh scattering, from reaching the pulse amplifier, being amplified and eventually reaching other components of the system.

Various embodiments of the invention include a system comprising a first polarization unit of an optical isolator, a second polarization unit of the optical isolator, the second polarization unit being configured for modifying a temporal length of a laser pulse, and a Faraday rotator disposed between the first polarization unit and the second polarization unit.

Various embodiments of the invention include a method comprising receiving a laser pulse at a first polarization unit, modifying the polarization of the laser pulse using a Faraday rotator or a mode converter, receiving the laser pulse at a second polarization unit, and modifying a temporal length of the laser pulse using the first polarization unit or the second polarization unit, the first polarization unit and second polarization unit being configured to form an optical isolator.

Various embodiments of the invention include a system comprising means for receiving a laser pulse at a first polarization unit, the first polarization unit and a second polarization unit being configured to form an optical isolator, means for modifying the polarization of the laser pulse, the means for modifying the polarization of the laser pulse being included in the optical isolator, and means for temporally compressing or expanding the laser pulse using the second polarization unit.

Various embodiments of the invention include a system comprising a pulse source configured to provide a laser pulse, a pulse amplifier configured to amplify the laser pulse, a delivery device configured to deliver the amplified laser pulse to a target material, and an optical isolator configured to prevent light from the target material from reaching the pulse amplifier. In these embodiments, the optical isolator is optionally disposed between the target material and the delivery device, or between the delivery device and the pulse amplifier. In these embodiments, the pulse amplifier is optionally a last pulse amplifier of a plurality of pulse amplifiers disposed along a beam line of the laser pulse.

DETAILED DESCRIPTION

Several embodiments of the invention are discussed herein. In general, these embodiments include one or more optical components configured to perform both optical isolation and either pulse expansion or compression contemporaneously. For example, in some embodiments, polarization sensitive optical components are configured for pulse compression and as a polarization unit of an optical isolator. As is discussed further herein, these polarization dependent components may include one or more gratings, a mode converter and Bragg fiber, or the like. Embodiments of the invention have been found to result in up to a 98% transmission efficiency while achieving the same optical isolation as prior art systems.

Figure 1:
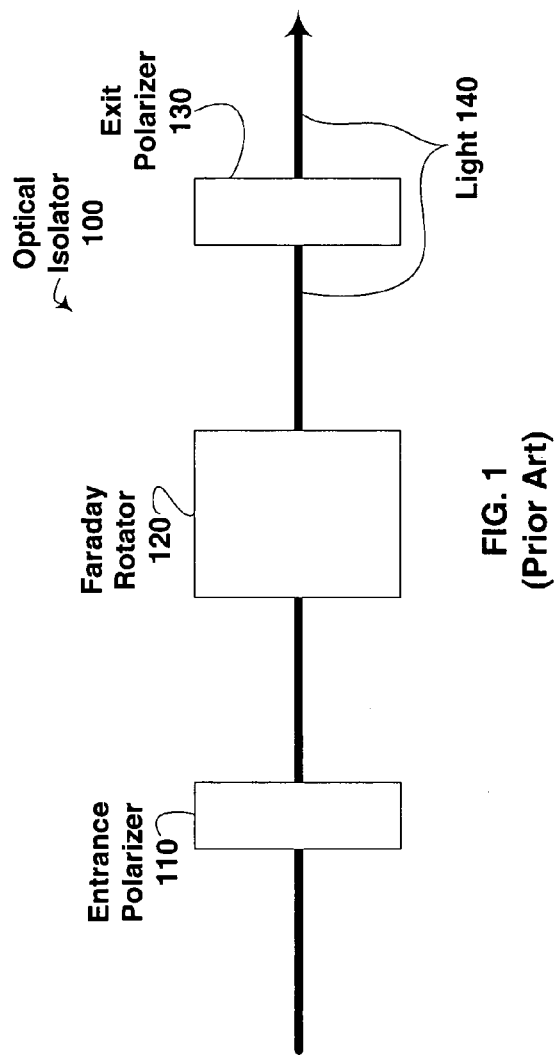
FIG. 1 illustrates an optical isolator according to the prior art.
Figure 2:
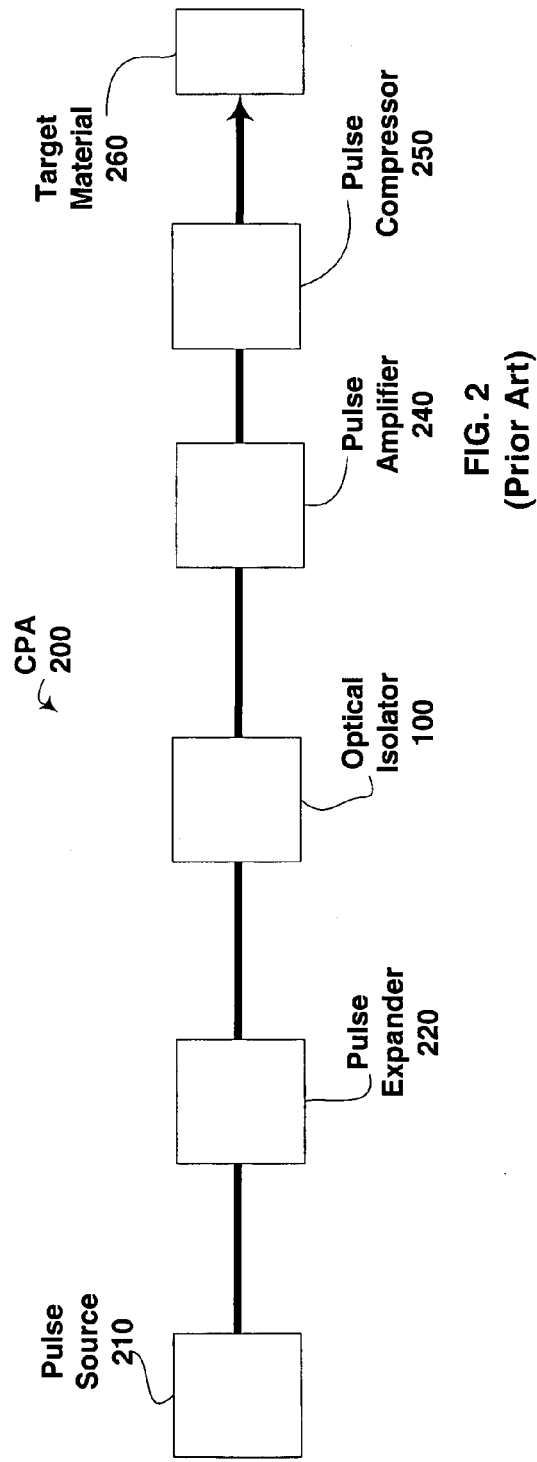
FIG. 2 illustrates a chirped laser system according to the prior art.
Figure 3:
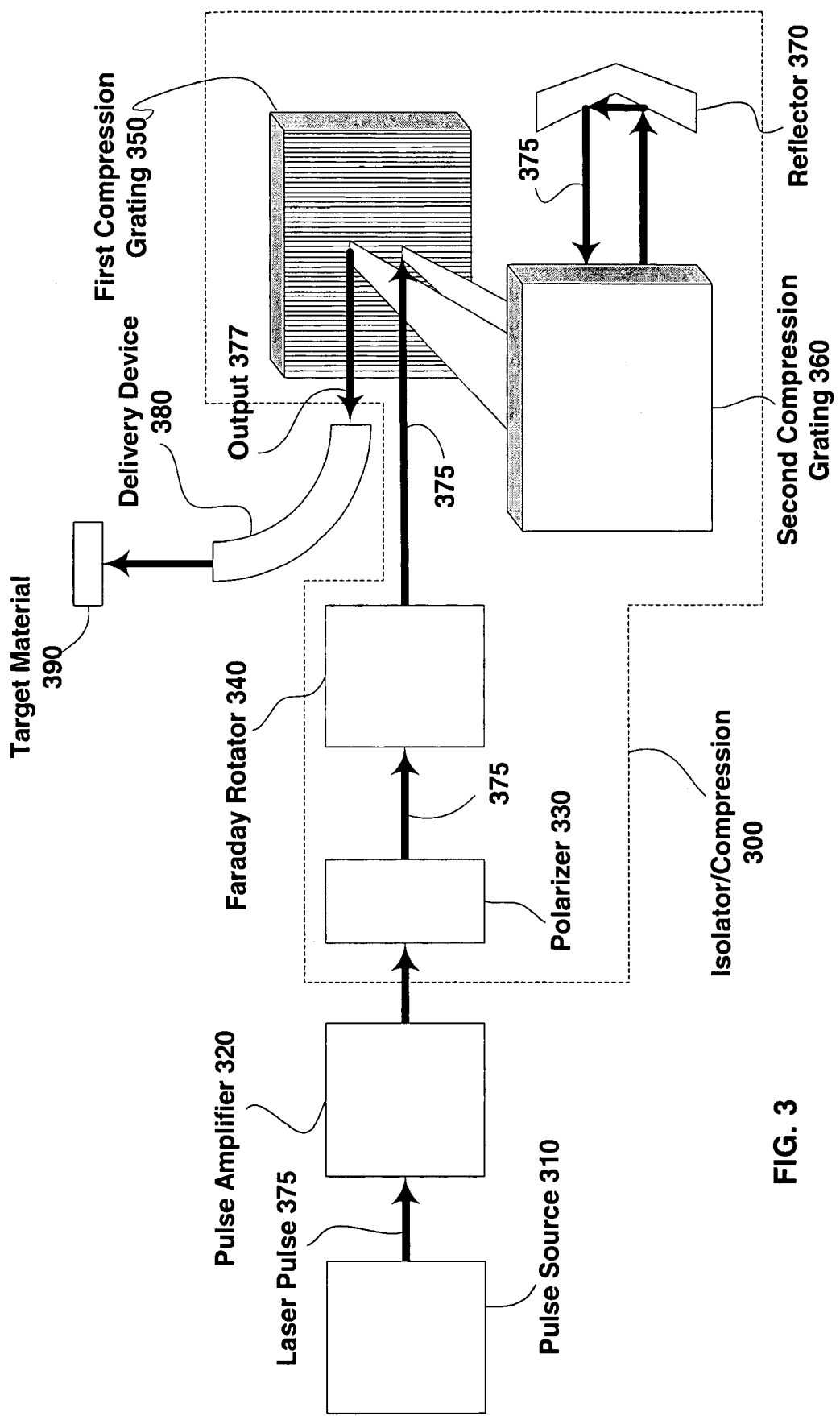
FIG. 3 illustrates a combination optical isolator and pulse compressor, according to various embodiments of the invention.

FIG. 3 illustrates a combination optical isolator and pulse compression system (Isolator/Compressor 300). Isolator/Compressor 300 is configured to receive a laser pulse from a Pulse Source 310, optionally following amplification by a Pulse Amplifier 320. Pulse Source 310 and Pulse Amplifier 320 can include any of the variety of pulse sources and amplifiers that are known in the art. For example, in some embodiments, Pulse Source 310 includes a ring laser and Pulse Amplifier 320 includes a fiber optic amplifier. A pulse expander (not shown) is optionally included between Pulse Source 310 and Pulse Amplifier 320. In some embodiments, Pulse Source 310, Pulse Amplifier 320 and Isolator/Compressor 300 comprise components of a chirped pulse amplification system.

In some embodiments, Isolator/Compressor 300 includes a Polarizer 330, a Faraday Rotator 340, a First Compression Grating 350, a Second Compression Grating 360 and a Reflector 370. Polarizer 330 is configured to linearly polarize a Laser Pulse 375 received from Pulse Source 310 or Pulse Amplifier 320, and to prevent transmission of light through Isolator/Compressor 300 to Pulse Source 310 or Pulse Amplifier 320 as is further discussed herein. In various embodiments, Polarizer 330 is a polarization unit including birefringent polarizers such as Wollaston, Glan-Thompson or Glan-Foucault prisms, reflection polarizers, or dichroic polarizers. Polarizers can also be based on subwavelength gratings. Such components are sometimes referred to as wire-grid polarizers and can be made out of multilayer gratings or parallel metal wires that reflect one polarization while transmitting the other. Other examples of polarization-sensitive subwavelength gratings can be found in *Selected papers on subwavelength diffractive optics*/editors Joseph N. Mait, Dennis W. Prather (SPIE milestones series; v. MS 166).

Faraday Rotator 340 is configured to rotate light using the Faraday affect. Therefore, Faraday Rotator 340 is typically placed within or includes a magnetic field. In some embodiments, Faraday Rotator 340 is configured to rotate the polarization of light received from Polarizer 330 by 45 degrees. As a result of the Faraday affect, the absolute direction of this rotation is dependent on the direction of the magnetic field not the direction of travel of the light. The absolute direction of this rotation relative to a coordinate system of Isolator/Compressor 300 will be independent of the direction of travel of a light pulse through Faraday Rotator 340. Thus, from a viewpoint of a laser pulse traveling along a forward path from Pulse Source 310 to the Isolator/Compressor 300, if Faraday Rotator 340 were configured to rotate the polarization clockwise by 45 degrees, polarized light traveling from Second Compression Grating 350 though Faraday Rotator 340 would be rotated in polarization by 45 degrees in the same absolute direction. First Compression Grating 350 and Second Compression Grating 360 are typically configured to receive light at a polarization of 45 degrees from that of Polarizer 330.

First Compression Grating 350, in combination with Second Compression Grating 360 and Reflector 370, is configured to modify a temporal length of a laser pulse, e.g., to temporally compress (or expand) an optical pulse received from Pulse Source 310 or Pulse Amplifier 320. First Compression Grating 350, in combination with Second Compression Grating 360 also comprise a second polarization unit of Isolator/Compressor 300. Compression is achieved by separating light within a laser pulse according to component wavelengths, providing a slight path length variation according to wavelength and then recombining the separated wavelengths. Optional Reflector 370 is configured to reflect the laser pulse back for a second pass between First Compression Grating 350 and Second Compression Grating 360. In some embodiments, an Output 377 of Isolator/Compressor 300 is obtained from a surface of First Compressing Grating 350.

Output 377 is optionally passed through a Delivery Device 380 to a Target Material 390. In various embodiments, Delivery Device 380 includes optic configured for directing a light pulse such as a lens, a reflector, a prism, a fiber optic, or the like. For example, in some embodiments, Delivery Device 380 includes a fiber optic, Bragg fiber, or optical collimator. Delivery Device 380 may or may not be a polarizing device.

Target Material 390 is a material configured to be modified, altered, treated or otherwise receive Output 377. For example, in some embodiments, Target Material 390 is a material to be ablated using Output 377, a tissue to receive therapeutic light, a semiconductor wafer being modified to produce integrated circuits or sensors, a metal component being micro-machined into objects such as stents and automotive fuel injectors, or the like.

Isolator/Compressor 300 is configured to operate as an optical isolator. For example, in some embodiments, Isolator/Compressor 300 is configured to prevent light from traveling in the "reverse" direction, e.g., from Target Material 390 towards Pulse Source 310. Light traveling in this direction is linearly polarized by interaction with First Compression Grating 350 and Second Compression Grating 360. This polarized light then passes through Faraday Rotator 340 where the plane of polarization is rotated by 45 degrees. This rotation is in the same absolute direction as the rotation experienced by light traveling in the forward direction. Following rotation by Faraday Rotator 340, light traveling in the reverse direction is polarized 90 degrees from the polarization of Polarizer 330. The light with the rotated polarization is, therefore, blocked (e.g., adsorbed) by Polarizer 330 and prevented from propagating further. In this manner, Isolator/Compressor 300 functions as an optical isolator.

In some embodiments, Isolator/Compressor 300 is configured to prevent light from traveling from Delivery Device 380 to Pulse Amplifier 320. For example, light scattered or reflected from a surface of Delivery Device 380 (e.g., an entrance facet) may travel toward Pulse Amplifier 320. Because Isolator/Compressor 300 is configured to prevent light from traveling in this direction and is (optionally) disposed between Delivery Device 380 and Pulse Amplifier 320, most of this light is prevented from reaching Pulse Amplifier 320.

In some embodiments, Isolator/Compressor 300 or Isolator 100 is configured to prevent light from traveling in the direction from Target Material 390 to Pulse Amplifier 320. In these embodiments, Isolator/Compressor 300 is optionally disposed between Target Material 390 and Delivery Device 380, between Delivery Device 380 and Pulse Amplifier 320, or elsewhere between Pulse Amplifier 320 and Target Material 390. Light traveling from Target Material 390 may result from a laser pulse being reflected from Target Material 390, from spontaneous emission or Rayleigh scattering occurring at a surface of Target Material 390 following generation of plasma by an ablation pulse, from fluorescence of Target Material 390 resulting from a laser pulse, or the like. Light may also be reflected from a surface of Delivery Device 380 or some other optic between Pulse Amplifier 320 and Target Material 390.

In some embodiments, Isolator/Compressor 300 is configured to prevent light from traveling from Pulse Amplifier 320 to Pulse Source 310. In these embodiments, Isolator/Compressor 300 is optionally disposed between Pulse Amplifier 320 and Pulse Source 310. Light traveling from Target Material 390 may result from a laser pulse being reflected from Target Material 390, from Rayleigh scattering occurring at a surface of Target Material 390 following generation of a plasma by an ablation pulse, from fluorescence of Target Material 390 resulting from an ablation pulse, from spontaneous emission within Pulse Amplifier 320, from amplification within Pulse Amplifier 320, or the like.

Figure 4:
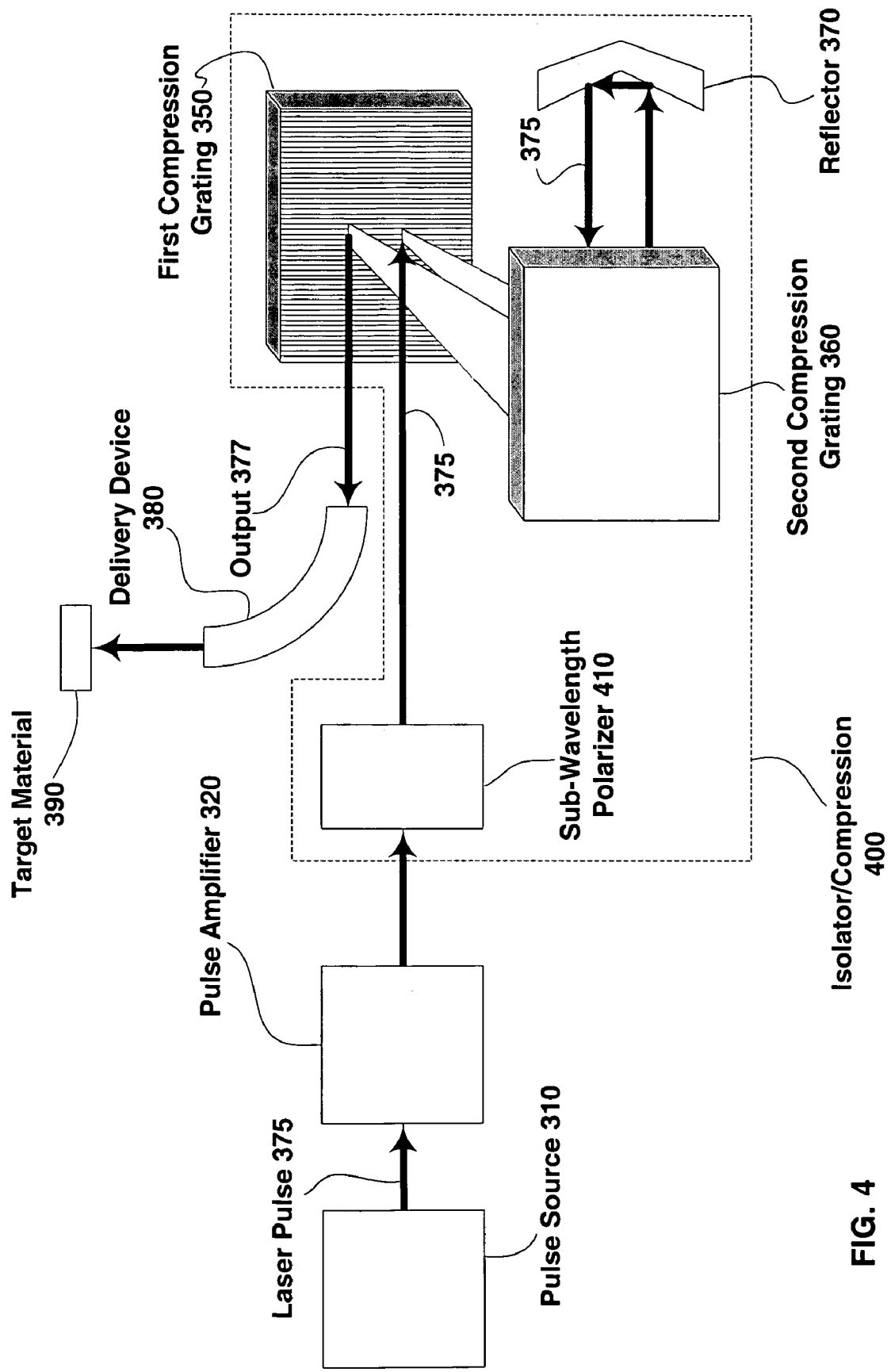
FIG. 4 illustrates another combination optical isolator and pulse compressor including a sub-wavelength polarizer, according to various embodiments of the invention.

FIG. 4 illustrates an Isolator/Compressor 400, including a Sub-Wavelength Polarizer 410. Isolator/Compressor 400 is an alternative embodiment of Isolator/Compressor 300. Sub-Wavelength Polarizer 410 is configured to perform the functions of both Polarizer 330 and Faraday Rotator 340, and may comprise a first polarization unit of Isolator/Compressor 400. In a typical embodiment, Sub-Wavelength Polarizer 410 includes a magnetized garnet or other material that produces the Faraday affect, and an etched or burned grating. In some embodiments, Sub-Wavelength Polarizer 410 is a sub-wavelength polarizer available from NanoOpto Corporation of Somerset, N.J.

Figure 5:
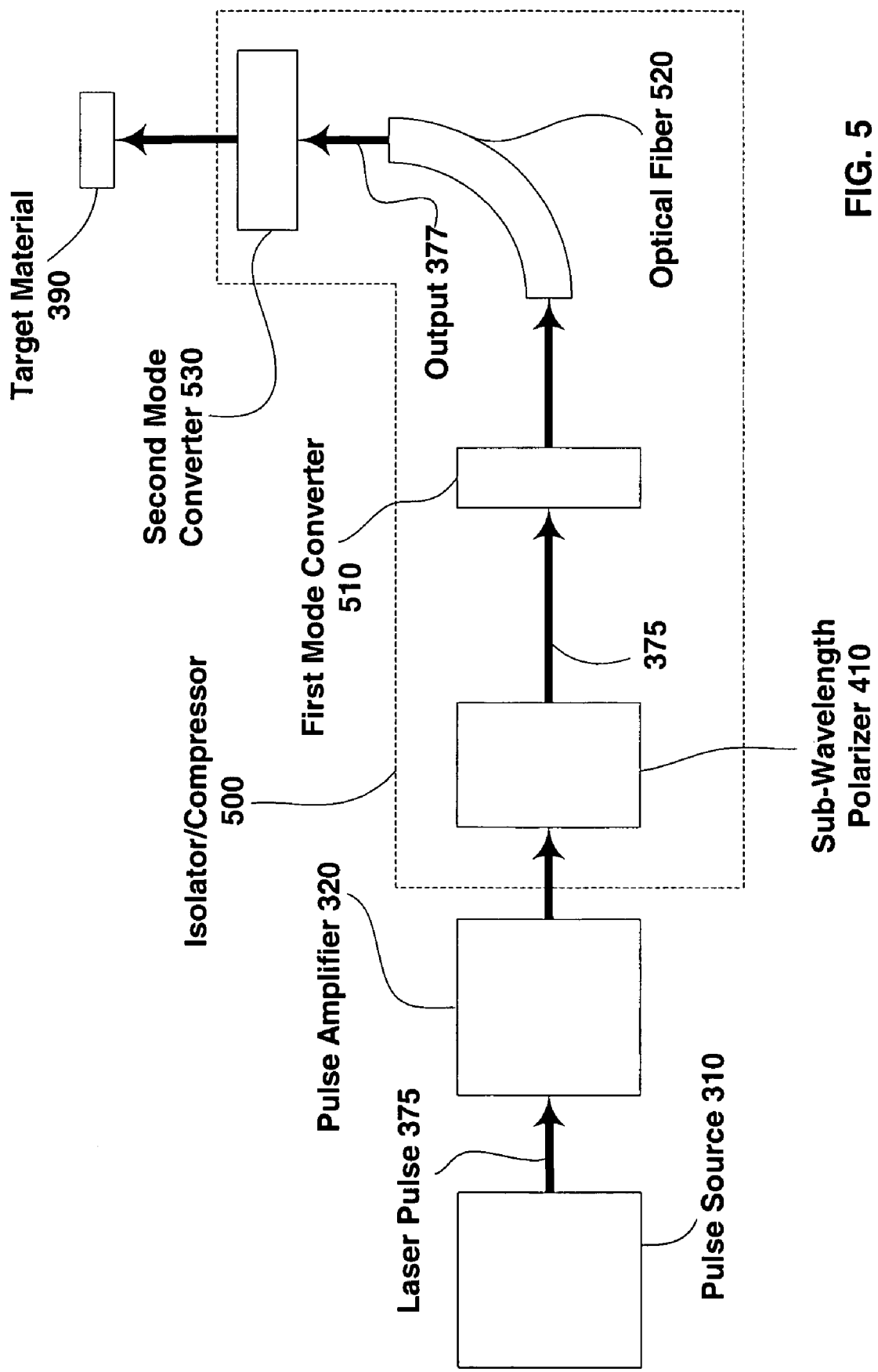
FIG. 5 illustrates another combination optical isolator and pulse compressor including a mode converter, according to various embodiments of the invention.

FIG. 5 illustrates an Isolator/Compressor 500 including at least one mode converter configured to change a polarization mode of a light pulse and an optical fiber configured to modify (e.g., compress or expand) the temporal length of the light pulse. Isolator/Compressor 500 is an alternative embodiment of Isolator/Compressor 300. The embodiments of Isolator/Compressor 500 illustrated by FIG. 5 include a First Mode Converter 510, an Optical Fiber 520 and an optional Second Mode Converter 530, which comprise a second polarization unit. These elements perform functions similar to those of First Compression Grating 350 and Second Compression Grating 360, and are optionally used as replacements for First Compression Grating 350 and Second Compression Grating 360. For example, First Mode Converter 510, Optical Fiber 520 and Second Mode Converter 530 are configured to compress (or expand) a laser pulse while also functioning as part of an optical isolator.

First Mode Converter 510, Optical Fiber 520 and Second Mode Converter 530 can be configured to compress a laser pulse where Optical Fiber 520 includes a fiber Bragg Grating or a Bragg fiber (e.g., a hollow core fiber). First Mode Converter 510 can be configured to convert linearly polarized light received from Sub-Wavelength Polarizer 410 or Polarizer 330 to a polarization mode better suited for introduction and passage through Optical Fiber 520. For example, in some embodiments First Mode Converter 510 is configured to convert laser pulses from a $LP_{01}$ mode to a $TE_{01}$ mode. Optional Second Mode converter 510 is configured to convert laser pulses back from the $TE_{01}$ mode to a $LP_{01}$ mode for delivery to Target Material 390.

First Mode Converter 510, Optical Fiber 520 and Second Mode Converter 530 can operate as part of an optical isolator (e.g., Isolator/Compressor 300) because the transmission characteristics of Optical Fiber 520 are polarization dependent. As with First Compression Grating 350 and Second Compression Grating 360, Optical Fiber 520 and First Mode Converter 510 are configured such that light traveling in the "reverse" direction (toward Pulse Source 310) will have a polarization that will cause the light to be blocked at Sub-Wavelength Polarizer 410 or Polarizer 330. For example, light passing back through Optical Fiber 520 in the direction from Target Material 390 towards Pulse Source 310 and in modes other than the $TE_{01}$ mode (e.g., a $TM_{01}$ mode) can suffer high loss rates in a hollow core fiber. Thus, a significant fraction of any light that successfully passes through Optical Fiber 520 and travels toward First Mode Converter 510 will be in the $TE_{01}$ mode. At First Mode Converter 510, this light is converted from the $TE_{01}$ mode to the $LP_{01}$ mode. First Mode Converter 510 is configured such that this converted light will not have the linear polarization angle required to pass through Sub-Wavelength Polarizer 410 or Polarizer 330 following Faraday rotation. Optical isolation is, therefore, achieved.

In alternative embodiments, First Mode Converter 510 and Optical Fiber 520 are part of an instance of Isolator/Compressor 300 disposed between Pulse Source 310 and Pulse Amplifier 320. In these embodiments, Isolator/Compressor 300 is configured to isolate and expand (rather than compress) laser pulses. Further in these embodiments, the order of Sub-Wavelength Polarizer (or Polarizer 330 and Faraday Rotator 340), First Mode Converter 510 and Optical Fiber 520 may be reversed.

Figure 6:
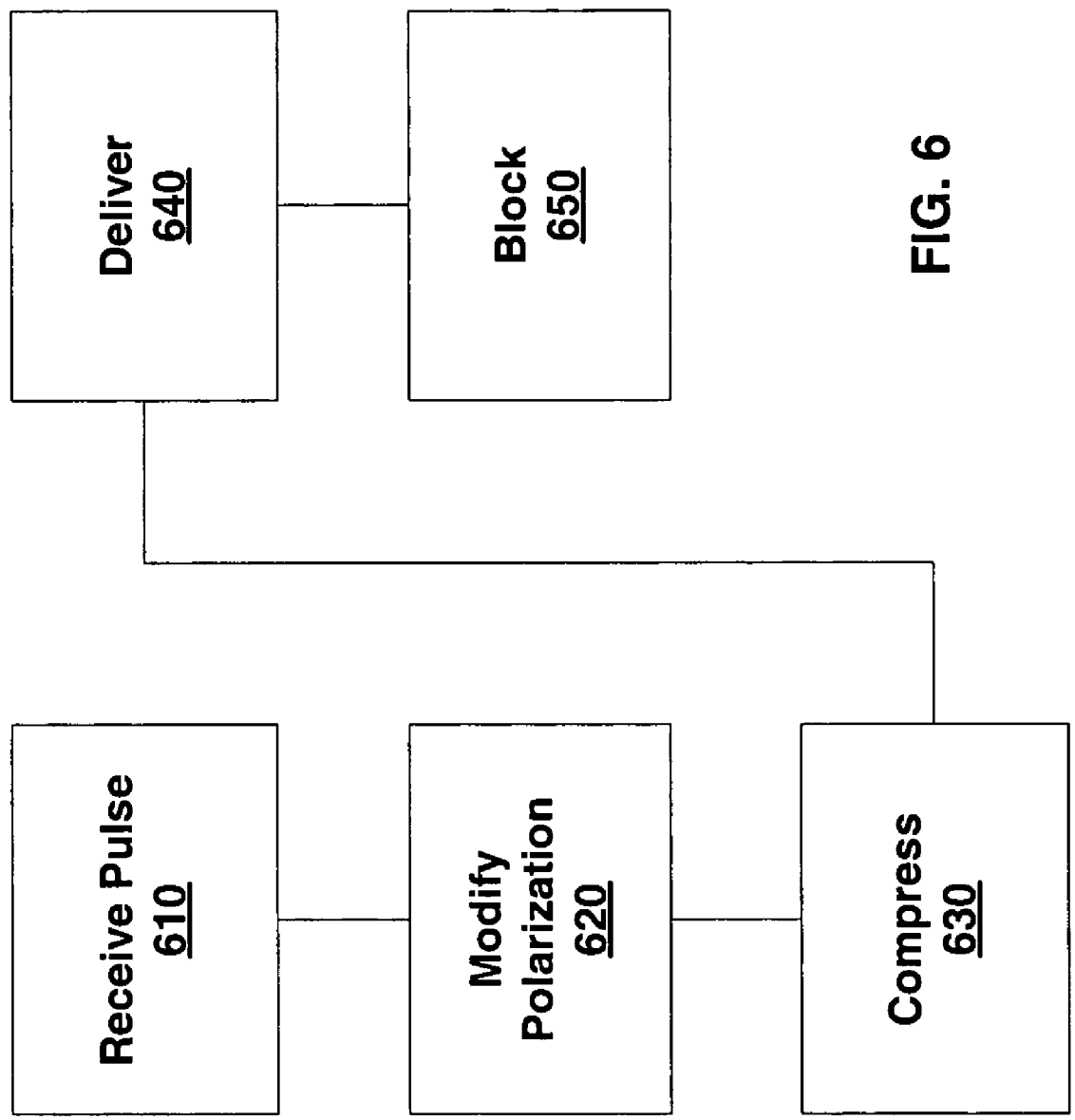
FIG. 6 illustrates a method according to various embodiments of the invention.

FIG. 6 illustrates a method according to various embodiments of the invention. In this method, light is allowed to pass through Isolator/Compressor 300 in a forward direction and prevented from passing in the reverse direction through Isolator/Compressor 300. In a Receive Pulse Step 610, a light pulse, e.g. Laser Pulse 375, traveling in the first forward direction is received by a first polarization unit. For example, a light pulse traveling along a beam path in a forward direction, away from Pulse Source 310, may be received by Polarizer 330 or Sub-Wavelength Polarizer 410. This light pulse may or may not have been amplified by Pulse Amplifier 320. The received light pulse is polarized by the first polarization unit.

In a Modify Polarization Step 620, the polarization of the received light pulse is modified. For example, the polarization may be rotated using Faraday Rotator 340 or Sub-Wavelength Polarizer 410. Modify Polarization Step 620 optionally further includes changing a polarization mode of the light pulse using First Mode Converter 510.

In a Compress Step 630, the received light pulse is compressed. In some embodiments, compression is accomplished using First Compression Grating 350 and Second Compression Grating 360. In some embodiments, compression is accomplished using Optical Fiber 520. The components used for pulse compression comprise a second polarization unit of Isolator/Compressor 300.

In a Deliver Step 650, the compressed light pulse is delivered to Delivery Device 380, Target Material 390, and/or another optical component. This delivery may result in one or more back reflections, e.g., from a surface of Delivery Device 380 and/or Target Material 390. This delivery may also result in emission of light from plasma formed by the light pulse striking Target Material 390.

In a Block Step 650, Isolator/Compressor 300 is used to block the back reflections, plasma generated light or any other light traveling in the "reverse" direction. This blocking occurs because the light is polarized as it passes through the second polarization unit, for example, comprising First Compression Grating 350 and Second Compression Grating 360, or First Mode Converter 510 and Optical Fiber 520. After being polarized by the second polarization unit and then rotated by a Faraday rotator, such as Faraday Rotator 340 or Sub-Wavelength Polarizer 410, the light is polarized such that it is blocked by the first polarization unit.

In alternative embodiments, the method illustrated in FIG. 6 is adapted for embodiments in which Isolator/Compressor 300 is configured for expansion rather than compression of a light pulse. In these embodiments, the first polarization unit may include Optical Fiber 520, or First Compression Grating 350 and Second Compression Grating 360. In these embodiments, the light blocked in Block Step 650 may result from Pulse Amplifier 320.

Several embodiments are specifically illustrated and/or described herein. However, it will be appreciated that modifications and variations are covered by the above teachings and within the scope of the appended claims without departing from the spirit and intended scope thereof. For example, in some embodiments, Isolator/Compressor 300 is disposed between Pulse Source 310 and Pulse Amplifier 320. In some embodiments, Faraday Rotator 340 and a quarter-wave plate are disposed between First Compression Grating 350 and Second Compression Grating 360 such that a laser pulse passes through Faraday Rotator 340 and the quarter-wave plate on one pass between First Compression Grating 350 and Second Compression Grating 360 but not on a second pass. In these embodiments, Polarizer 330 and Sub-Wavelength Polarizer 410 are optional. It is anticipated that, Isolator/Compressor 300 may be used in applications other than chirped pulse amplification. For example, Isolator/Compressor 300 may be used in communication systems or ring lasers.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
    a first polarization unit of an optical isolator;
    a second polarization unit of the optical isolator, the second polarization unit including a mode converter and a Bragg fiber, and configured for modifying a temporal length of a laser pulse; and
    a Faraday rotator disposed between the first polarization unit and the second polarization unit.

2. The system of claim 1, wherein the first polarization unit includes a linear polarizer.

3. The system of claim 1, wherein the first polarization unit includes a sub-wavelength polarizer on the Faraday rotator.

4. The system of claim 1, wherein the optical isolator is configured for light to pass in a direction from the first polarization unit to the second polarization unit, but not in a direction from the second polarization unit to the first polarization unit.

5. The system of claim 1, further including a seed source and an amplifier, the optical isolator being configured to pass a light pulse received from the amplifier from the first polarization unit through the second polarization unit, and to prevent some light from being received by the amplifier.

6. The system of claim 1, further including a delivery device, a seed source and an amplifier, the optical isolator being configured to pass light received from the amplifier to the delivery device and not to pass light received from the delivery device to the amplifier.

7. The system of claim 1, further including a seed source and an amplifier, the first polarization unit and the second polarization unit configured to pass light in a direction from the seed source to the amplifier and to block light in a direction from the amplifier to the seed source.

8. The system of claim 1, wherein the second polarization unit includes at least one grating configured to compress the laser pulse.

* * * * *